PROGRAMMABLE HIGH-SPEED READ-ONLY MEMORY DEVICES

Filed Oct. 21, 1966

INVENTORS
DAVID H. CHUNG
THOMAS W. DOSS

E. Mickey Hubbard
ATTORNEY 3,529,299

PROGRAMMABLE HIGH-SPEED READ-ONLY MEMORY DEVICES

David Hsiong Chung and Thomas W. Doss, Dallas, Tex., assignors to Texas Instruments Incorporated, Dallas, Tex., a corporation of Delaware Filed Oct. 21, 1966, Ser. No. 588,493
Int. Cl. G11c *5/02, 11/40, 17/00*
U.S. Cl. 340—173 8 Claims

ABSTRACT OF THE DISCLOSURE

High-speed read-only memory devices of the type that are programmable for permanently storing a plurality of words with each word having an equal number of corresponding bit positions for selectively storing logic "1" and "0" values wherein a plurality of transistors are respectively located at the bit positions of each word and are interconnected so that when an input signal is applied to one of the word address inputs, the bit outputs that are connected to selected ones of the transistors will have a logic "1" value thereon, while the bit outputs of the remaining transistors will have a logic "0" value thereon, thereby electrically representing one of the permanently stored words.

This invention relates generally to computers, data processing systems and the like, and more particularly, but not by way of limitation, relates to an improved high speed, programmable read-only memory.

A read-only memory can be defined as a memory in which data is permanently programmed during construction and which cannot be altered by the system in which it is incorporated. When a particular word in the memory is addressed, the contents of that word appear at the output of the memory. This is the only communication the computer or data processing system has with the memory.

A major limitation of the state of the art read-only memories is access time. The most common type of read-only memories now in use are based upon magnetic cores and paper capacitor storage bits, and all have the common characteristic of relatively slow access times, usually greater than about 100 nanosecends. Because of this slow speed, high speed computers must rely on extensive and often highly complex logic to perform the control functions which can best be performed by a read-only memory. In addition, the read-only memories heretofore utilized are relatively large, complex and expensive.

An important object of this invetnion is to provide a read-only memory having a much faster access time, typically being at least one order of magnitude faster.

Another important object of the invention is to provide such a device which occupies a much smaller volume.

Still another object is to provide such a device which may be very economically fabricated on a mass production basis.

A still further object of the invention is to provide such a device in integrated circuit form which can be selectively programmed during fabrication with a minimum change in the photomasks used during fabrication.

Another very important object of the invention is to provide such a device which can be easily and economically programmed by the ultimate user after fabrication of the device in integrated circuit form.

These and other objects are accomplished in accordance with the present invention by a memory comprised of a plurality of words each having a plurality of corresponding bits. At least each bit where a logic "1" is to be stored is formed by an active switching device having gain. In the simplest form, each bit where a logic "1" value is to be stored is a transistor. The collectors of the transistors in the corresponding bit positions of all of the words are common and form a bit output. The emitter of each transistor is connected to an emitter voltage supply. The bases of the transistors of each word are common and form an address input for the particular word.

In accordance with a more specific aspect of the invention, the circuit is fabricated in integrated circuit form with a transistor provided at each bit position of each word. At the bit positions where a logic "0" is to be stored, the transistor is disabled in the "off" condition so that the transistor is effectively removed from the circuit. Each transistor may be disabled by either an open emitter circuit or an open base circuit.

In accordance with an important, more specific aspect of the invention, the integrated circuit is initially formed either with all base and emitter circuits closed and then programmed by opening either the base or emitter circuit of the transistors and the logic "0" bit positions, or is initially fabricated with either the base or emitter circuit open, and then programmed by selectively closing the open circuit of the transistors at the bit positions where a logic "1" is to be stored. For example, either an open emitter or base circuit can be closed either by ball bonding jumper wires between two contact pads or by depositing and patterning a metallic film to form thin film conductors. Or, closed base and emitter circuits can be selectively opened by applying a high current pulse through a fuse section to blow the circuit open. In accordance with one important aspect, the base circuit of each transistor is provided with a fuse section which can be blown open by applying a high current pulse through the collector-base circuit of the transistor. The particular transistor can easily be selected after the device is packaged by selecting the appropriate bit output and the word address input common to the transistor to be disabled.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
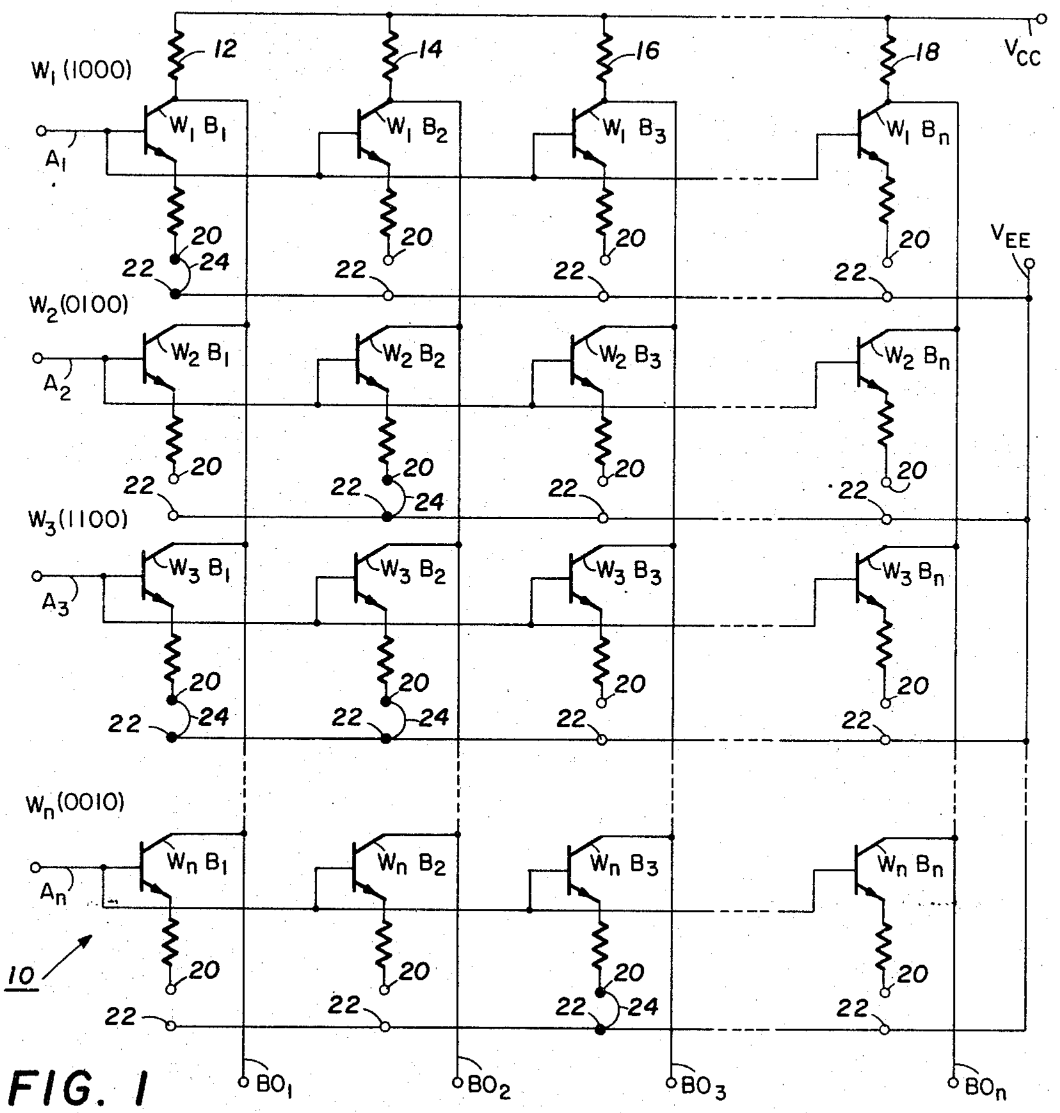
FIG. 1 is a schematic circuit diagram of a read-only memory fabricated in accordance with the present invention.

Referring now to FIG. 1, a read-only memory constructed in accordance with the present invention is indicated generally by the reference numeral 10. The read-only memory is comprised of a plurality of words, $W_1$, $W_2$, $W_3$ . . . $W_n$, each of which is comprised of a corresponding number of bits, $B_1$, $B_2$, $B_3$ . . . $B_n$. Thus, word $W_1$ is comprised of bits $W_1B_1$, $W_1B_2$, $W_1B_3$ and $W_1B_n$, word $W_2$ is comprised of bits $W_2B_1$, $W_2B_2$, $W_2B_3$ and $W_2B_n$, word $W_3$ is comprised of bits $W_3B_1$, $W_3B_2$, $W_3B_3$ and $W_3B_n$ and finally word $W_n$ is comprised of bits $W_nB_1$, $W_nB_2$, $W_nB_3$ and $W_nB_n$.

Each storage bit includes the same circuitry and is comprised essentially of a single transistor. The bases of the transistors of all of the bits in each word are common and form a word address input A. Thus, the bases of the transistors of each of the bits of word $W_1$ are common and form a word address input $A_1$, the bases of the transistors of all of the bits of word $W_2$ are common and form word address input $A_2$, the bases of all of the transistors in word $W_3$ are common and form word address input $A_3$, and the bases of all of the transistors of word $W_n$ are common and form word address input $A_n$.

The collectors of the corresponding bits $B_1$ of all of the words are common and form a bit output $BO_1$, and are connectable through a common resistor 12 to a collector voltage supply $V_{CC}$. Similarly, the collectors of the transistors of all of the $B_2$ bits are common and form a single bit output $BO_2$ and are connected through resistor 14 to the collector voltage supply $V_{CC}$. The collectors of the transistors of the bits $B_3$ are common and form a bit output $BO_3$, and are connected through resistor 16 to the collector voltage supply $V_{CC}$. The collectors of transistors $B_n$ are common and form a bit output $BO_n$, and are connected through resistor 18 to the collector voltage $BO_n$, and are connected through resistor 18 to the collector voltage supply.

The emitter of each transistor is connected through a resistor to a terminal 20, which is positioned adjacent to a terminal 22 on an emitter voltage supply bus $V_{EE}$. When a logic "1" is to be programmed into a bit, the emitter circuit of the transistor is closed, such as by jumper wires 24, so that the transistor is enabled by actively connecting it in the circuit. On the other hand, where a logic "0" is to be stored in a bit, the emitter circuit of the transistor is left open so that the transistor is disabled in the "off" condition. It will be appreciated that the designation of logic "1" and logic "0" is arbitrary and can be reversed if desired. The purpose of the resistor in the emitter circuit of each transistor is to limit the emitter current to protect the transistor. If desired, the emitter resistors can be eliminated and a resistor put in the base circuit to limit the current and thereby protect the transistor. This can be achieved internally of the transistor merely by spacing the base contacts further from the emitter contact, thus eliminating the need for a discrete resistor.

In the operation of the read-only memory 10, assume first that all of the address inputs $A_1$–$A_n$ are at a sufficiently low voltage, that the active transistors $W_1B_1$, $W_2B_2$, $W_3B_1$, $W_3B_2$ and $W_nB_3$ are all turned "off." Then none of the words $W_1$–$W_n$ will be selected. As used in this discussion, a low voltage level will designate a more negative voltage as compared to a relatively high voltage level. Each of the bit outputs $BO_1$–$BO_n$ will then be at a relatively high voltage level, which is arbitrarily designated as the logic "0" level. Then when one of the address inputs A, but only one, is raised to a level sufficiently high to turn the transistors "on," so that the particular input will be addressed, the transistors in the addressed word will conduct, thus causing the respective bit outputs to go to a relatively low voltage level, which is arbitrarily designated as a logic "1" level.

Thus, when input $A_1$ is raised to the high voltage level, transistor $W_1B_1$ is turned "on" so that output $BO_1$ goes to a lower voltage level, which is designated as a logic "1" level. However, since the transistors at the remaining bit positions $W_1B_2$, $W_1B_3$ and $W_1B_n$ are turned "off" because the words are not addressed, ouputs $BO_2$, $BO_3$ and $BO_n$ remain at the higher logic "0" level. Thus, the outputs $BO_1$–$BO_n$ represent the logic number 1000 stored in the addressed word $W_1$. Similarly, when word address input $A_2$ is raised to the high voltage level, bit output $BO_2$ goes to the logic "1" level while the other bit outputs remain at the logic "0" level, so that the logic number 1100 is provided at the outputs. When address in-input $A_3$ is raised to the high voltage level, both outputs $BO_1$ and $BO_2$ go to a logic "1" level, while outputs $BO_3$ and $BO_n$ remain at the logic "0" level, thus the logic number 1100 is provided at the outputs. When address input $A_n$ is raised to the high voltage level, output $B_3$ goes to a logic "1" level, while the remaining bit outputs remain at a logic "0" level, to provide logic number 0010 at the outputs.

Figures 2, 4:
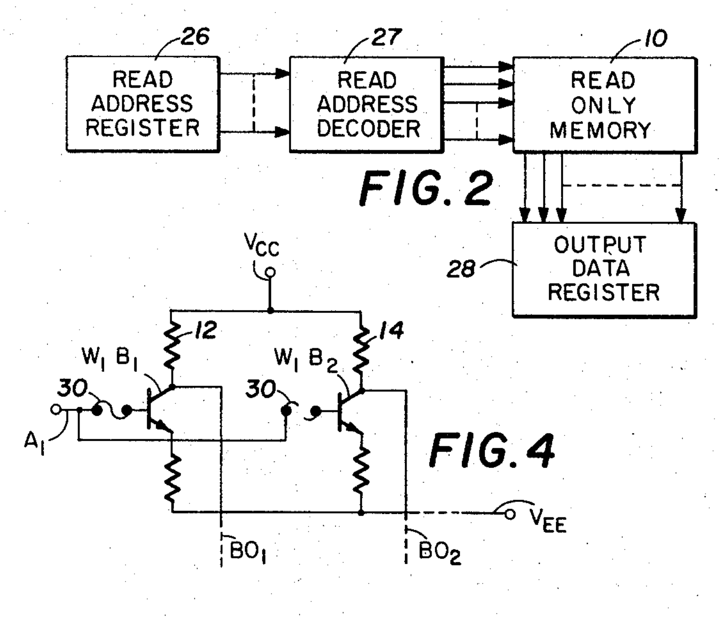
FIG. 2 is a block diagram showing a typical system in which the read-only memory of FIG. 1 may be used.
FIG. 4 is a schematic circuit diagram of a programmable storage bit for a read-only memory in accordance with this invention.

The associated control circuitry typically used with the read-only memory 10 is indicated in the block diagram of FIG. 2. A read address register 26 has a storage register, such as a bank of flip-flops, with as many binary outputs as are required to individually define each word in the read-only memory 10. These outputs go to an address decoder 27 which has an output for each word in the memory, and produces the high voltage for addressing a word on only one output for each set of inputs from the address register 26. As a result of the single output, a single word in the read-only memory 10 is addressed, and the bit outputs reflect the logic number stored in the addressed word. The bit output BO are then connected to an output data register 28, which may comprise a bank of flip-flops or other bistable storage devices, for storage until the data has served its purpose.

If desired, the read-only memory 10 can be fabricated using discrete components, in which case the transistors at the bit positions where a logic "0" is to be stored can be completely eliminated to save fabrication costs. It is to be understood that within the broader aspects the transistor is merely representative of a class of devices having three or more terminals which exhibit gain. For example, field effect transistors could be substituted for the more conventional transistors illustrated. An important advantage of the circuit 10 is that no current flows through the bit columns when the bit outputs are at a logic "0" level. Thus the bits consume no power except when a particular transistor is turned "on" to produce a logic "1" output, and then power is consumed only in that one transistor. Thus, the maximum power dissipation in the read-only memory is determined by the number of logic "1" values stored in the addressed word and is not related to the number of words in the memory. If it is desired, the transistors of the bits could be made as one branch of a current switch, but this would require a continuous supply of power regardless of the word addressed or the value stored in each bit.

In accordance with a very important, more specific aspect of the invention, the read-only memory 10 is fabricated in integrated circuit form on one or more substrates using conventional processing techniques. A single integrated circuit substrate typically includes about thirty-two words, each having about thirty-two storage bits, and the associated devices. Several hundred integrated circuit packages may then be incorporated into a single memory having a very large number of words. For example, a memory having 250,000 bits is practical, although this is by no means a limiting number and much larger memories can be fabricated if desired. Since each word will typically store a different number, each integrated circuit must be separately programmed. One of the largest cost factors in an integrated circuit is the generation of the very small and precise photomask required for the fabrication of the circuit. Therefore, it is highly desirable to utilize the same set of photomasks to fabricate all of the circuits, and then to provide a means for programming the circuit after it is essentially completed. Therefore, a good transistor is fabricated at each bit position of each word and the circuit formed as illustrated in FIG. 1, except for the interconnections 24 between terminals 20 and 22. Terminals 20 and 22 are formed as expanded contact pads **20*a* and 22*a* shown in FIG. 3. Then a very fine diameter wire 24*a*** can be bonded to each set of pads to close the emitter circuit and enable the transistors where a logic "1" is to be stored. This permits all of the integrated circuits to be fabricated identically, and then the integrated circuit chips to be individually programmed. In this case, the programming would normally be accomplished by the manufacturer, although the ultimate user could program the circuits provided it also had the capability of sealing the packages once the packages were programmed.

Figures 3, 5:
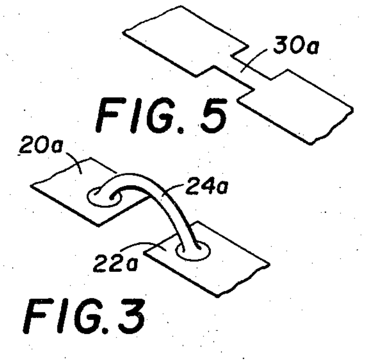
FIG. 3 is a simplified drawing illustrating the technique by which the circuit of FIG. 1, when fabricated in integrated circuit form, can be programmed.
FIG. 5 is a simplified drawing illustrating the circuit of FIG. 4 fabricated in integrated circuit form so that it can be programmed using a method of the present invention.

Another important embodiment of the invention is illustrated in FIGS. 4 and 5 wherein corresponding parts are designated by corresponding reference characters. In this embodiment, the memory is also fabricated in integrated circuit form to provide an array of active transistors. However, rather than providing an open emitter circuit which can subsequently be closed to program the memory, the circuit is initially fabricated with both the emitter circuit and the base circuit closed. A fusing means 30 is connected in the base circuit of each individual transistor. The fusing means 30 may merely be comprised of the lead to the base of the transistor, which is customarily relatively narrow with respect to the remaining portion of the collector-base circuit, or may comprise a necked portion 30*a* in the thin film emitter lead as illustrated in FIG. 5.

Thus, it will be noted that all of the transistors in the system of FIG. 1 are initially enabled, and must be selectively disabled by opening the fusing means 30 as illustrated at bit $W_1B_2$ of FIG. 4 in order to program the memory. This is achieved after the circuit has been completely packaged by applying a high current pulse between the appropriate bit output line $BO_1$–$BO_n$. The pulse is applied in a direction to forward bias the collector-base junction of the transistor and is of sufficient magnitude to blow the fusing means 30 and open the base circuit of the transistor. Once the base circuit of the transistor is open, the reverse biased junction of the transistor will effectively block current so that the transistor will be disabled in the "off" condition. For example, if bit $W_1B_1$ is to store a logic "1" and bit $W_1B_2$ a logic "0," the base circuit of bit $W_1B_1$ would not be opened. However, the base circuit of bit $W_1B_2$ would be opened by applying a current pulse across bit output line $BO_2$ and address line $A_1$ of a polarity such as to forward bias the collector-base junction with sufficient current to blow the fuse means 30. Then transistor $W_1B_2$ cannot be turned "on" when address input $A_1$ goes to a high voltage level.

From the above description, it will be appreciated that the integrated circuit can be programmed by opening either the emitter circuit or the base circuit of the transistor at each bit position where a logic "0" is to be stored. This can be achieved by initially fabricating the integrated circuit array such that either the emitter or the base circuits are all open, and then selectively closing the open circuit in order to program a logic "1," or the integrated circuit may be initially fabricated with both the base and the emitter circuits closed, and then one of the circuits selectively opened. Also, if desired, the circuit could be programmed by disabling a transistor during any one of several steps in the fabrication process. For example, a diffused region necessary for the fabrication of an active transistor could be eliminated, or the base or emitter circuit could be left open during the final photomask process step required for the formation of the interconnecting circuit formed on the substrate. Or if desired, the circuits could be either closed or opened using a conventional photolithographic technique after the circuit has been completed.

From the above detailed description of preferred embodiments of the invention, it will be noted that a very simple circuit has been described. This circuit can be very economically manufactured in integrated circuit form at a low cost, and can be economically programmed either by the manufacturer or the ultimate user, even after the device has been completely packaged.

The memory is extremely fast. Each of the bit positions has a response time limited only by the response time of a single transistor. The response time of each transistor can be further enhanced if the collector, emitter and base voltages are selected such as to provide Class A operation. More specifically, it is highly desirable to prevent the transistors from becoming saturated by insuring that the base voltage is always less than the collector voltage. As used herein, the more positive voltage is considered the higher voltage, although its absolute value may be negative. For example, the collector voltage supply $V_{CC}$ is typically ground potential, and the emitter voltage supply $V_{EE}$ about −2.3 volts. Then if the collector and base emitter resistors are both about 50 ohms, then the lower input voltage level would typically be about −1.95 volts, and the higher input voltage level about −0.90 volt. The logic "1" level at the bit outputs BO would be about −0.60 volt and a logic "0" level about 0.0 volt. It is important to note that when the transistor is turned "on" by the higher input voltage level of −0.90 volt, the collector is at a logic "1" level of −0.60 volt. Thus, the collector is sufficiently more positive than the base to insure that the transistor does not become saturated. In a memory system such as illustrated in FIG. 2 having about 250,000 bits, a typical response time is less than 20 nanoseconds. As the memory is decreased in size, the response time increases almost linearly, and conversely, as the size of the memory increases, the response time decreases.

Although preferred embodiments of the invention have been described in detail, it is to be understood that various changes, substitutions and alterations can be made therein without departing from the spirit and scope of the invention as defined by the appended claims.

What is claimed is:

1. A high-speed read-only memory device of the type that is programmable for permanently storing words, with each word having an equal number of corresponding bit positions for selectively storing logic "1" and "0" values, said device comprising in combination:

(a) a plurality of word address input means;

(b) a plurality of bit output means;

(c) first and second supply voltages;

(d) a plurality of transistors respectively located at said bit positions of each word, with each transistor having base, emitter and collector electrodes; and (e) interconnection means for selectively connecting the emitter circuit of said transistors to said second supply voltage; said second supply voltage being negative relative to said first supply voltage; wherein (f) the collector electrodes of the transistors that are located in corresponding bit positions are connected to said first supply voltage through a corresponding resistor, and are connected in common to their corresponding bit output means; and wherein (g) the base electrodes of the transistors that are located in the bit positions for each word are connected in common to their corresponding word address input means; and wherein (h) the emitter circuits of the transistors located in the bit positions where a logic "1" is stored are connected to said second supply voltage by said interconnecting means; and (i) means for applying an input signal having a voltage intermediate the voltage of said first and second supply voltages to one of said word address input means, the bit output means connected to transistors having their emitter circuit connected to said second supply voltage having said logic "1" value thereon, and the remaining bit output means having said logic "0" value thereon whereby said bit output means electrically represent one of said permanently stored words.

2. The high-speed read-only memory device of claim 1 wherein (a) said device is fabricated in integrated circuit form; and wherein (b) said interconnecting means are strip leads connecting the base electrode of each transistor to its respective word address input means; and wherein (c) said device may be programmed for permanent storage of said words by selectively disconnecting said strip leads in transistors where a logic "0" value is to be stored.

3. The high-speed read-only memory device of claim 1 wherein (a) said device is fabricated in integrated circuit form; and further includes (1) an emitter bonding pad formed on one surface of said integrated circuit, and (2) a second supply voltage bonding pad formed on said one surface adjacent to but electrically isolated from said emitter bonding paid; wherein (b) said interconnection means electrically connect said emitter bonding pads to said second supply voltage bonding pad of selected ones of said transistors.

4. The high-speed read-only memory device of claim 3 wherein (a) said interconnecting means are jumper wires having their ends respectively bonded to said emitter bonding pad and said second voltage source bonding pad of said selected transistors.

5. The high-speed read-only memory device of claim 3 wherein (a) said interconnecting means are strip leads formed on said one surface of said integrated circuit so as to electrically connect said emitter bonding pad and said second voltage source bonding pad of said selected transistors.

6. The high-speed read-only memory device of claim 1 wherein (a) said device is fabricated in integrated circuit form; and further includes (1) a base bonding pad formed on one surface of said integrated circuit, and (2) a word address input bonding pad formed on said one surface adjacent to but electrically isolated from said base bonding pad; wherein (b) said interconnecting means electrically connect said base bonding pads to said word address input bonding pad of selected ones of said transistors.

7. The high-speed read-only memory device of claim 6 wherein (a) said interconnection means are jumper wires having their ends respectively bonded to said base bonding pad and said word address input bonding pad of said selected transistors.

8. The high-speed read-only memory device of claim 6 wherein (a) said interconnecting means are strip leads formed on said one surface of said integrated circuit so as to electrically connect said base bonding pad and said word address input bonding pad of said selected transistors.

References Cited

UNITED STATES PATENTS

| | | | |
|---|---|---|---|
| 2,992,409 | 7/1961 | Lawrence | 307—254 X |
| 3,028,659 | 4/1962 | Chow | 340—173 |
| 3,152,840 | 10/1964 | Lin | 307—303 |
| 3,172,083 | 3/1965 | Constantine | 340—173 |
| 3,284,677 | 11/1966 | Haas | 307—213 X |
| 3,402,392 | 9/1968 | Schroeder | 340—166 |
| 3,363,154 | 1/1968 | Haas | 307—213 X |

OTHER REFERENCES

Millman and Taub: Pulse, Digital, and Switching Waveforms, McGraw-Hill, New York, 1965, p. 322.

TERRELL W. FEARS, Primary Examiner

J. F. BREIMAYER, Assistant Examiner

U.S. Cl. X.R.

340—166; 307—238, 254, 303